(No Model.)
W. F. HEATH & M. NIRDLINGER.
CAR COUPLING.
No. 266,992. Patented Nov. 7, 1882.
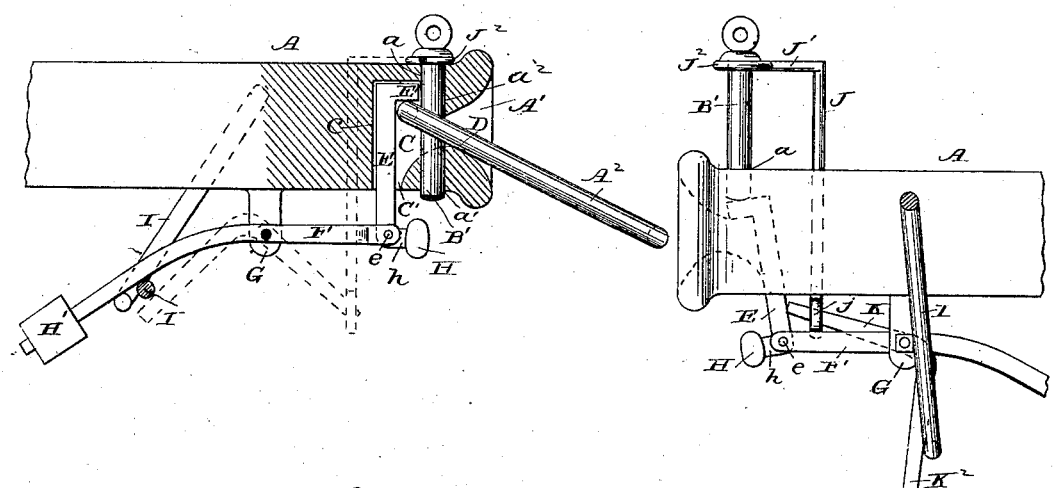
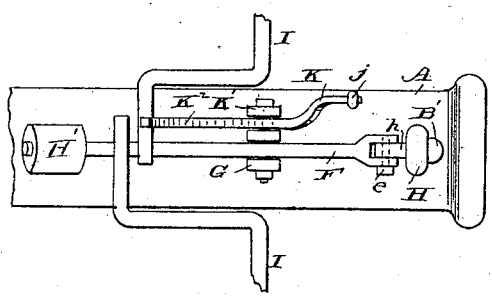
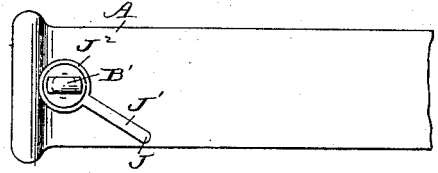
Witnesses:
N. N. Low
J. S. Barker
Inventors
Wilbur F. Heath and Max Nirdlinger
by Doubleday & Bliss
attys.

UNITED STATES PATENT OFFICE.

WILBUR F. HEATH AND MAX NIRDLINGER, OF FORT WAYNE, INDIANA.

CAR-COUPLING.

SPECIFICATION forming part of Letters Patent No. 266,992, dated November 7, 1882.

Application filed September 27, 1882. (No model.)

*To all whom it may concern:*

Be it known that we, WILBUR F. HEATH and MAX NIRDLINGER, citizens of the United States, residing at Fort Wayne, in the county of Allen and State of Indiana, have invented certain new and useful Improvements in Car-Couplings, of which the following is a specification, reference being had therein to the accompanying drawings.

Figure 1 is a longitudinal vertical section of two opposing draw-heads having applied thereto coupling devices of our improved character. Fig. 2 is a bottom plan view of one of the same. Fig. 3 is a top view.

In the drawings, A represents the draw-head, which, so far as its general shape and construction are concerned, may be of substantially the ordinary character, and it may be mounted and supported upon the car in any preferred way. It has a flaring mouth, A', adapted to receive and guide properly the approaching end of a link from an opposing draw-head, and has an aperture, $a$, through the top and a corresponding aperture, $a'$, through the bottom, to permit the insertion of a coupling-pin, B'. Immediately behind the apertures $a$ and $a'$ the draw-head is provided with a chamber or recess, C, which communicates with the mouth A', and with the slot C', which latter extends through the bottom of the draw-head, and also behind and above the chamber C. Preferably the rear wall, $c$, of the slot is straight or rectilinear in section, to better fulfill a purpose to be hereinafter set forth. The inner chamber, C, and the mouth A' are so related as to form a fulcrum at D, upon which a coupling-link can be rocked when it is desired to guide it into an opposing draw-head, and so that the link can be swung up or down with sufficient freedom. The devices for thus guiding the link are constructed as follows:

E represents an arm or bar situated in the rear part of the slot C', and adapted to slide vertically and to swing back and forward longitudinally therein. At the upper end it is provided with an angular or hooked portion, E', projecting forwardly, and adapted to engage with the inner end of a link, as shown in Fig. 1, and adapted also to support the coupling-pin B', as shown in Fig. 1. Prior to having the link from an opposing draw-head inserted, the coupling-pin B' is drawn up and the arm or bar E is swung forward until its projecting part E' lies below the aperture $a$, so as to support the pin B', as shown in Fig. 1. As the link from the opposing draw-head is inserted it strikes against the arm E and pushes it backward, which causes the pin B' to drop through the link. The parts are so related that when a link is fastened in place the hook or projecting part E' will lie directly above the inner end of the link, so that when any downward movement of the arm E occurs, said part E' shall immediately engage with said inner end of the link. The arm E is, at the lower end, pivotally connected to a lever, F, the fulcrum for which is provided in a bracket, G, depending from and secured to the under side of the draw-head.

H is a weight secured to an arm, $h$, projecting forwardly from the arm E. This weight tends to throw the upper end or projecting part, E', forward—that is, tends to swing the arm E forward around the pivot $e$, by which it is secured to the lever F. Therefore if the coupling-pin B' be drawn upward and the link A² withdrawn, the hook part E' will be immediately thrown forward by the weight H until it strikes against the shoulder $a^2$, where it is held in position to support the pin B'.

H' is a weight at the inner end of the lever F, it tending to move and hold upward the arm E. The gravity of this latter weight, H', is overcome by means of crank-levers I I, extending respectively to the sides of the car, and arranged to be operated there without requiring the passage of any one between the cars. The operator by means of either of the crank-levers I I can throw up the inner end of the weighted lever, F, and thereby pull downward the arm E, so that he can thus easily and instantly throw up the outer end of the link A², the hook part E' being so arranged as always to engage with the upper side of the inner end of the link, as above described.

The method of operating this simple automatic coupler will be readily understood. To prepare a draw-head to receive a link carried by an opposing one it is only necessary to lift up the pin B', for the weight H will then instantly bring the hook-projection E' forward, so as to support said pin, after which the parts are in the position to automatically couple the draw-head to the opposing one, for when the entering link strikes the arm E the pin B' is disengaged and drops through the link. It will be seen that the link rests upon the fulcrum at D, at a point considerably nearer to the inner end than the outer, and therefore the weight of the outer end of the link will insure that said end shall move down, if there is no downward pull exerted on the inner end. Preferably the horizontal dimensions of the recess C are such that the links can enter only far enough to allow the pin to drop freely through.

By arranging the arm or bar E, as shown, so as to project through the bottom of the draw-head, and combining with it devices which move it vertically on substantially straight lines, we can provide a better engagement with the link at all times than is provided in the couplers heretofore used, having link-lifters swinging in curved lines, and, moreover, the arm or bar E can be inserted and removed much more readily.

The devices which we have above described can be operated, if desired, without using the others shown in the drawings. We prefer, however, to employ in combination therewith the pin-lifting mechanism shown, and which will now be described.

J represents a vertically-sliding rod, which at its upper end carries a short arm, J', having a loop or eye, J². This loop or eye is adapted to engage loosely with the head at the upper end of the coupling-pin B'. At the lower end of the bar J there is an eye, j, through which there passes the end of a lever, K, pivoted in a hanger, K'. The engagement between the bar J and the lever K is loose, so that as the one swings and the other slides there shall be sufficient freedom in their action. The lever K has an arm, K², by means of which the forward end of the lever can be thrown up or down. This arm is moved forward by the same crank-levers, I I, which are used to lift the weighted lever F. It will be seen that if either of the crank-levers I be so rocked as to throw the arm K² forward the sliding bar will be pushed upward, and with it the pin B'. These means for lifting the pin obviate the necessity of any person entering between the cars for this purpose. When the bar J has been thrust far enough up and the pin B' with it the rocking arm E will swing out to hold the pin in its uppermost position, as above described.

What we claim is—

1. In an automatic car-coupler, the combination, with the draw-head, having the recess C to receive the inner end of the link, of the hooked arm or bar E E', passing through the lower side of the draw-head, and arranged loosely therein to slide vertically on substantially straight lines, and the means attached thereto below the draw-head, and extending to the sides of the car, for drawing down the inner end of the link, substantially as set forth.

2. The combination, with the draw-head, having the recess C, the link, and the coupling-pin, of the rising and falling and swinging hooked bar E E', the weight H, arranged to swing said bar forward, and the weight H', arranged to move said bar upward, substantially as set forth.

3. The combination, with the draw-head, having the recess C behind the coupling-pin, and the slot or groove C' behind said recess, and extending through the bottom of the draw-head, of the bar or arm E, situated in substantially the same longitudinal plane of the draw-head as the coupling-pin, and extending through the bottom of the draw-head in the slot C', wherein it slides on substantially straight lines vertically, means for automatically swinging outward the upper end of said bar to hold the coupling-pin up, and mechanism attached to said bar or arm E below the draw-head, and extending to the side of the car, for sliding it up and down, through the bottom of the draw-head to guide the end of the link vertically, substantially as set forth.

4. The combination, with the draw-head, having the aperture C behind the coupling-pin, of the rising and falling and swinging bar E E', the weighted arm, h, carried thereby, the weighted lever F, pivotally connected thereto, and the means extending to the side of the car for elevating the inner end of said weighted lever F, substantially as set forth.

5. The combination, with the draw-head, having a recess to permit the vertical swinging of the inner end of the link, of the hooked bar E, arranged to swing forward to hold the pin up, and to be swung backward by the entering link to permit the pin to drop, means for automatically engaging said bar E loosely with the inner end of the link, and the means, extending to the side of the car and loosely connected to said bar E below the draw-head, to pull downward the inner end of the link, substantially as set forth.

6. The combination, with the pin-lifting devices and the link-guiding devices, of the crank-levers extending to the sides of the car, and adapted to operate alternately the pin-lifting devices and the link-guiding devices, substantially as set forth.

7. The combination, with the coupling-pin and the devices for elevating the pin from the side of the car, of the swinging bar E within the draw-head, and provided with a weight arranged, substantially as set forth, to lock the pin in its uppermost position after being elevated by said devices.

In testimony whereof we affix our signatures in presence of two witnesses.

WILBUR F. HEATH.
MAX NIRDLINGER.

Witnesses:
H. M. METZGUR,
MARTIN V. B. SPENCER.